Oct. 12, 1954
C. A. CHAMBERLAIN
2,691,269
ROTARY, TOROIDAL CHAMBER TYPE HYDRAULIC
COUPLING AND CONTROL THEREFOR
Filed March 20, 1953
3 Sheets-Sheet 1
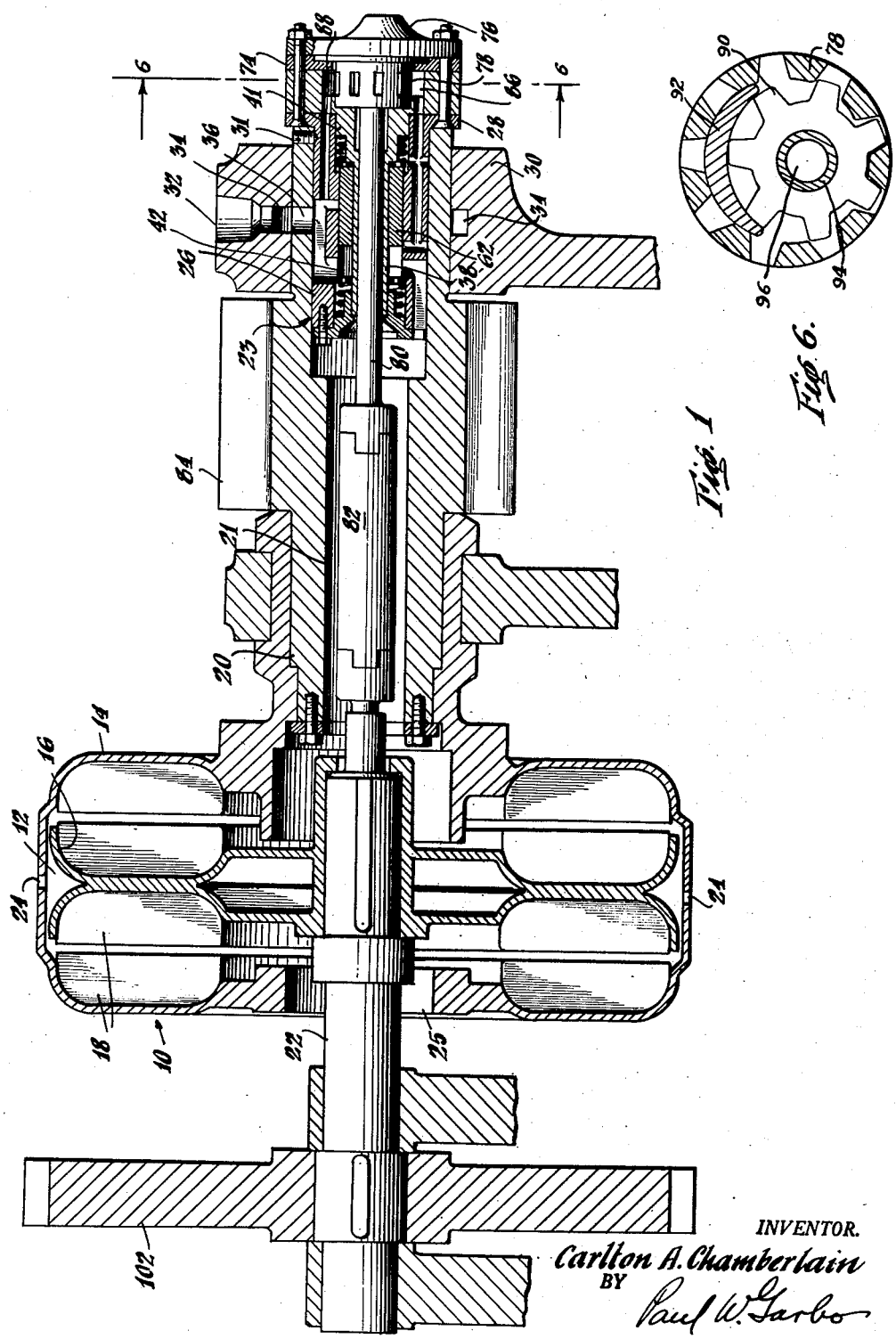
INVENTOR.
Carlton A. Chamberlain
BY
Paul W. Garbo
AGENT Oct. 12, 1954
C. A. CHAMBERLAIN
2,691,269
ROTARY, TOROIDAL CHAMBER TYPE HYDRAULIC
COUPLING AND CONTROL THEREFOR
Filed March 20, 1953
3 Sheets-Sheet 2
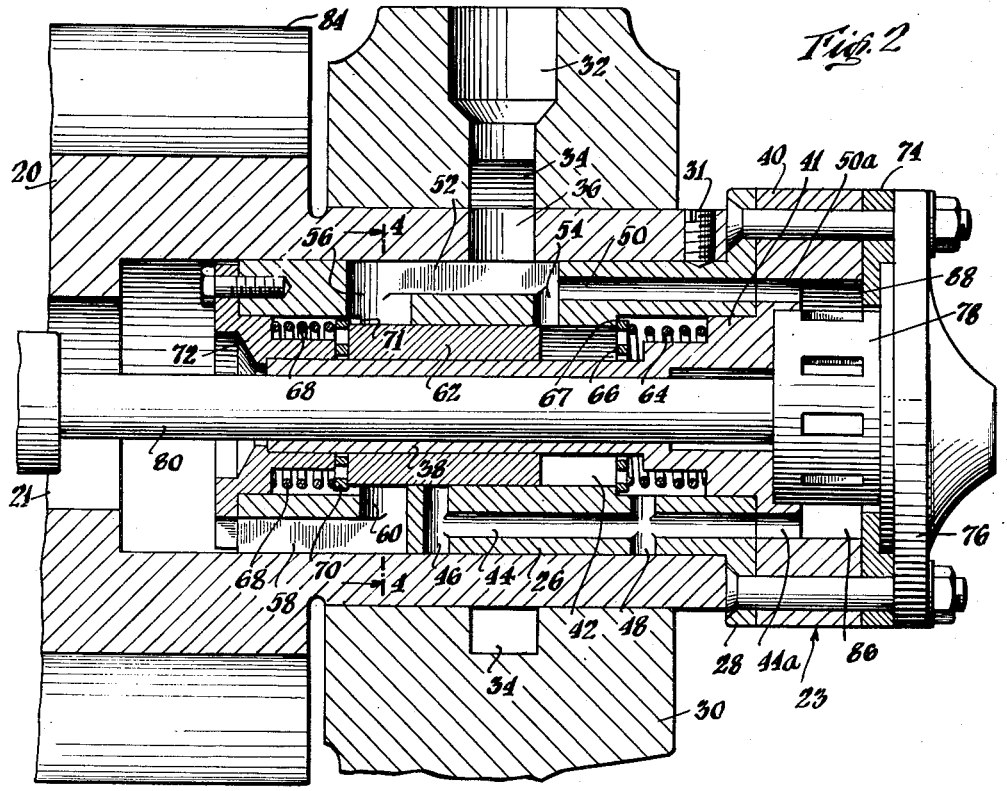
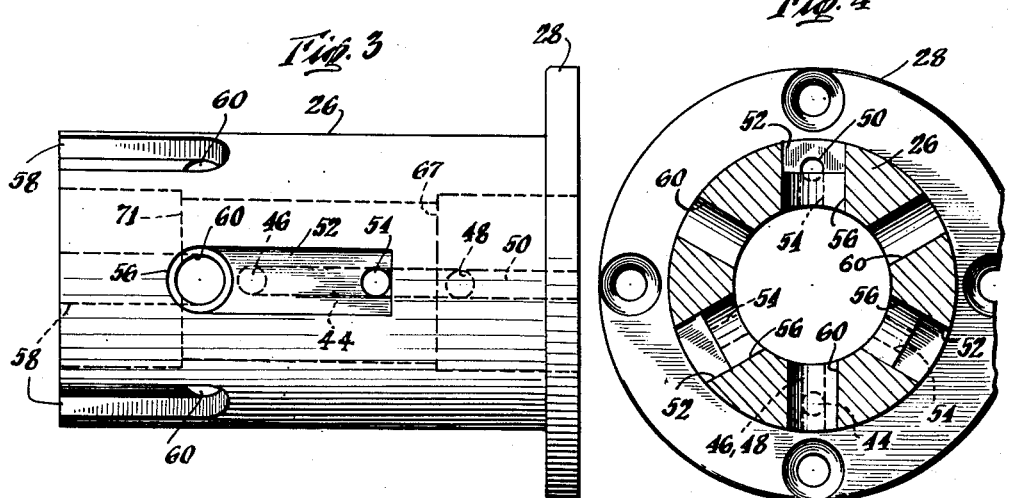
INVENTOR.
Carlton A. Chamberlain
BY
Paul W. Garbo
AGENT Oct. 12, 1954

C. A. CHAMBERLAIN 2,691,269

ROTARY, TOROIDAL CHAMBER TYPE HYDRAULIC
COUPLING AND CONTROL THEREFOR

Filed March 20, 1953

INVENTOR.
Carlton A. Chamberlain
BY
Paul W. Garbo
AGENT

Patented Oct. 12, 1954

2,691,269

UNITED STATES PATENT OFFICE 2,691,269

ROTARY TOROIDAL CHAMBER TYPE HYDRAULIC COUPLING AND CONTROL THEREFOR

Carlton A. Chamberlain, Olean, N. Y., assignor to Dresser Operations, Inc., Olean, N. Y., a corporation of California Application March 20, 1953, Serial No. 343,638

7 Claims. (Cl. 60—54)

This invention relates to torque transmitting means and is particularly directed to a torque transmitting means including a hydraulically loadable coupling together with automatic control means for rendering the coupling capable of transmitting torque in but one direction.

One-way drives with hydraulically loadable couplings linking a driving member with a driven member are known to the art, but the prior art has not solved the problem of releasing the coupling or clutch, when desired, with a simple low-inertia mechanism. For example, Patent 2,521,117 to Du Bois et al. shows a hydraulic coupling released by a lost motion arrangement which blocks oil flow to the coupling but only when the driven shaft begins to rotate more rapidly than the driving shaft, while Patent 1,938,357 to Sinclair shows a Föttinger coupling in which a counter-pressure pump with gradually increasing force opposes flow of liquid into the coupling as the driven shaft independently begins to rotate more and more rapidly.

One object of the invention is to provide a hydraulic coupling with a novel release means for emptying the coupling when one of the coupled members begins to rotate faster than the other coupled member.

A further object comprises means for releasing a hydraulic coupling at a desired ratio of the speeds of the input and output shafts.

Generally speaking, this invention comprises the conventional structure of a hydraulic coupling connecting driven and driving shafts and provided with an oil supply which is admitted to the coupling through one of the shafts and which drains from the coupling through openings in its casing, together with the improvement of a control mechanism mounted on one of the shafts, the control mechanism acting to open or close the flow of oil to the coupling when the driving shaft is rotating faster or slower, respectively, than the driven shaft. Advantageously, the control mechanism has a slide valve and a pump which circulates the oil in one direction to open the slide valve for flow of oil to the coupling and in the opposite direction to close the slide valve, thereby stopping the flow of oil to the coupling. The pump housing is arranged to rotate with one of the two shafts connected to the hydraulic coupling while the pump rotor rotates with the other shaft. Thus, when the pump housing rotates faster than its rotor, the slide valve is caused to move toward one of its terminal positions, whereas when the rotor rotates faster than the housing, the slide valve is forced toward its opposite terminal position.

Referring now to the drawings:

Figure 1 is a sectional elevation taken through the axis of a transmission embodying the invention;

Figure 2 is an enlarged view of the right hand end of Figure 1;

Figure 3 is a plan view of cylindrical body 26 removed from the assembly of Figure 2;

Figure 4 is a sectional view of body 26 taken along the line 4—4 of Figure 2;

Figure 6 is an enlarged sectional view of pump rotor 78 taken along the line 6—6 of Figure 1.

Figure 5:
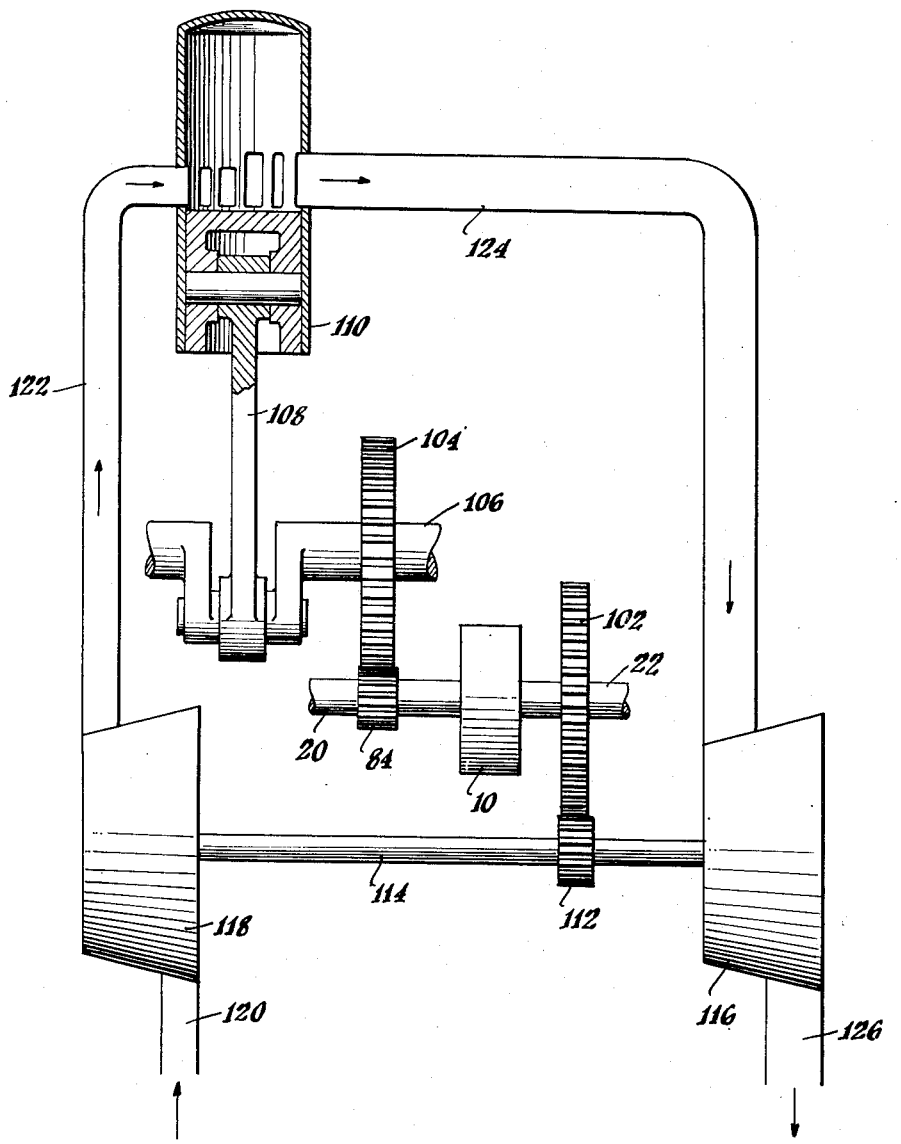
Figure 5 is a diagrammatic view showing the use of the transmission of this invention with a turbo-supercharger of a two-cycle reciprocating gas engine.

Conventional hydraulic coupling 10 comprises a chamber 12 bounded by rotatable coupling member 14. Inside chamber 12 is the other rotatable coupling member 16, both members 14 and 16 having the usual sets of vanes 18 extending into chamber 12 by which torque may be transmitted between members 14 and 16 when chamber 12 is filled with a suitable coupling liquid. Hydraulic coupling member 14 is bolted or otherwise secured to shaft 20 while coupling member 16 is secured to shaft 22. With the construction so far described, when coupling chamber 12 is full of liquid, torque may be transmitted therethrough from shaft 20 to shaft 22 or in the reverse direction.

Liquid is supplied to coupling 10 through central channel 21 of hollow shaft 20 and is removed from coupling 10 through a plurality of peripherally spaced radial openings 24 in coupling member 14; excess liquid may overflow through central relief opening 25. Advantageously, the number of radial openings 24 and their size is correlated to provide a drainage rate approximately equal to one-half the rate at which coupling liquid is supplied through channel 21 of hollow shaft 20, the excess liquid draining out of relief opening 25.

The coupling liquid is supplied to channel 21 of shaft 20 through a plurality of radial openings 36 in hollow shaft 20 which advantageously are alinged with peripheral groove 34 in the inner surface of bearing 30. Coupling liquid is fed through tap 32 which pierces bearing 30 and communicates with groove 34.

Interposed between liquid inlet openings 36 and channel 21 of hollow shaft 20 is control mechanism 23 which advantageously is inserted into the open end of hollow shaft 20 and secured thereto by one or more set screws 31.

Control mechanism 23 has an outer hollow cylindrical body 26 with an integral flange 28 that seats against the end of hollow shaft 20, and an inner hollow cylindrical body 38 with an integral flange 40 that seats against flange 28. Flange 40 has a shoulder 41 that fits snugly against inner surface of cylindrical body 26 and thus maintains an annular space 42 between the inner surface of cylindrical body 26 and the outer surface of cylindrical body 38. A drilled passage 44 extends from the outer face of flange 28 through cylindrical body 26 parallel to the axis thereof to radial hole 46. Radial hole 46 intersects passage 44 at a point intermediate the ends thereof. A shorter drilled passage 50, spaced 180° from passage 44, extends from the outer face of flange 28 through cylindrical body 26 parallel to its axis to slot 52 in the outer surface of body 26. The end of slot 52 communicating with passage 50 also communicates with radial hole 54 while the opposite end meets larger radial hole 56. Two other like slots 52 and radial holes 56 are spaced 120° from the first mentioned slot 52 and radial hole 56 and from each other. In line with passage 44 is a slot 58 in the outer surface of body 26, starting at the end opposite flange 28 and ending in radial hole 60. Two other like slots 58 and holes 60 are spaced 120° from the first mentioned slot 58 and hole 60 and from each other.

A cylindrical ring 62 is positioned to slide freely in annular space 42. A coil spring 64 is disposed between shoulder 41 of body 38 and perforated washer 66 bearing against shoulder 67 on the inner surface of body 26. Another coil spring 68 is held at the opposite end of annular space 42 between perforated washer 70 retained by shoulder 71 of body 26 and spacer ring 72 that is bolted to body 26 and thus maintains the free ends of bodies 26 and 38 in concentrically spaced relation.

Mounted in the external end of control mechanism 23 is an internal gear pump. The pump housing is provided by the flanged end 40 of cylindrical body 38, spacer ring 74 and terminal plate 76, all bolted tightly together and to flange 28 of body 26. Pump rotor 78 is disposed to rotate freely in this housing when there is relative rotation between its shaft 80 and the rest of control mechanism 23. Shaft 80 of the internal gear pump is connected through rubber coupling 82 with shaft 22. Thus, rotation of shaft 22 causes rotation of shaft 80 and pump rotor 78, while the remainder of control mechanism 23 including the pump housing rotates with hollow shaft 20.

The elements within rotor 78 of the internal gear pump are shown in Figure 6. The teeth of idler 90 mesh with the slots of rotor 78 and contact the fixed crescent 92. Idler 90 is provided with bushing 94 and rotates on stationary shaft 96 which, like crescent 92, is attached to terminal plate 76.

When power is applied to driving shaft 20 through its gear 84, coupling member 14 and all of control mechanism 23 except pump rotor 78 and shaft 80 will rotate therewith. During start-up, driven shaft 22 and its associated coupling member 16, rubber coupling 82, shaft 80 and pump rotor 78 will slip and consequently rotate at a lower speed than driving shaft 20. Oil pumped through tap 32 into groove 34 passes through holes 36 in shaft 20 into slots 52 in cylindrical body 26. With the driving shaft 20 overrunning driven shaft 22, the relative rotation between the pump housing and rotor 78 forces oil from passage 44 and an aligned passage 44a in flange 40 and housing space 86 into housing space 88, passage 50a in flange 40 and aligned passage 50 of body 26. The pumping effected within control mechanism 23 causes cylindrical ring 62 to move toward the right as shown in Figure 1. With ring 62 in this position, the oil now flows from slots 52 through holes 56, annular space 42, holes 60, slots 58 and channel 21 into coupling member 14. The oil drains from coupling member 14 by way of holes 24 but at a lesser rate than it is entering; therefore, coupling member 14 is soon filled with oil to the point that excess oil overflows at opening 25. In order to avoid building up an excessive pressure differential across the gear pump, ring 62 is permitted to over-travel, after uncovering holes 56 and 60, by compressing spring 64 so that relief hole 46 is uncovered and oil is admitted into passage 44 to relieve the suction therein.

As the slip of driven shaft 22 decreases to zero, i. e., shafts 20 and 22 rotate at the same speed, the flow of oil in passages 44 and 50 stops, equalizing the pressure on the ends of ring 62. Spring 64 then causes ring 62 to cover relief hole 46. When driven shaft 22 rotates faster than driving shaft 20, the relative motion of the pump housing and rotor 78 is the reverse of what it was during the start-up with the result that oil is now pumped from passage 50 to passage 44. Ring 62 is thus forced to the left until it covers holes 56 and 60, thereby stopping the supply of oil to the hydraulic coupling. Under these circumstances, the oil quickly drains from coupling member 14. Pressure on the right end of ring 62 causes ring 62 to over-travel against spring 68 and uncover relief hole 54, thus relieving the pressure behind ring 62.

It is well to note that Figure 1 shows the position of ring 62 when driving shaft 20 is rotating faster than driven shaft 22, whereas the position of ring 62 when the driven shaft 22 is rotating faster than driving shaft 20 is shown in Figure 2.

By appropriate arrangement of springs 64 and 68, control mechanism 23 may be actuated at the the instant that the shafts 20 and 22 vary from synchronous speeds. In the embodiment of the invention illustrated in the drawings, the expanding motion of spring 64 is constrained by perforated washer 66 when it contacts shoulder 67 on the inner surface of cylindrical body 26 and, likewise, perforated washer 70 and shoulder 71 limit the expansion of spring 68. Thus, the motion of springs 64 and 68 is restricted to that portion of the travel of ring 62 referred to as overtravel. As already explained, overtravel of ring 62 effects the undercovering of relief opening 46 (Figure 1) when shaft 20 is rotating faster than shaft 22 and the uncovering of relief opening 54 (Figure 2) when the rotational speed of shaft 22 overtakes that of shaft 20. In this arrangement, the opening or closing of holes 60 by the movement of ring 62 is independent of springs 64 and 68 so that no hydraulic effort is needed to move ring 62. Consequently, at the slightest reversal in direction of torque transmission, ring 62 will start to move and the rate of relative motion of the two shafts will affect only the time interval for completing the opening or closing of holes 60.

On the other hand, if springs 64 and 68 are arranged to bear directly against the ends of ring 62 and hence exert forces on ring 62 throughout its entire travel, control mechanism 23 may be actuated at any desired relative rotation of the two shafts by appropriate selection of the spring rates. If spring 68 is the stronger, then holes 60 remain open when shaft 22 rotates faster than shaft 20 until the internal gear pump develops enough counteracting hydraulic pressure to compress spring 68. If spring 64 is the stronger, the situation is reversed and ring 62 will close holes 60 before the rotational speed of shaft 22 equals that of shaft 20. Here again the absolute stiffness of both springs determines the sensitivity of ring 62 to actuation at the desired relative speed.

Another factor determinative of operational sensitivity lies in ring 62 itself. The area of the end faces of ring 62 which are subject to hydraulic pressure determines the total force available for moving ring 62. It is well to note that ring 62 is subjected to pressure at one end and a simultaneous vacuum at the other end; thereby, the entire pressure difference exerted by the gear pump is brought to bear on ring 62. Accordingly, the pressure-suction characteristics of the selected pump is another factor determinative of operational sensitivity.

The ability to preset the operational characteristics of control mechanism 23 is of more than academic interest. The transmission illustrated in Figures 1 to 4 may, for example, be used as a speed governing device. In such case, shaft 20 will be driving shaft 22 and spring 64 will be stronger than spring 68. Then, so long as there is sufficient load on shaft 22 to result in a marked slippage of members 14 and 16 of hydraulic coupling 10, the two shafts will rotate at sufficiently different rates to enable the gear pump to force ring 62 back against spring 64 thereby leaving holes 60 open for flow of oil to coupling 10. When the load on shaft 22 decreases so will the slippage in coupling 10, and consequently shaft 22 will more nearly approach the rotational rate of shaft 20. At a predetermined point of approach, the pressure forces exerted by the pump will be less than the strength of spring 64 so that ring 62 will slip leftwards and close holes 60 thereby cutting off the oil supply to coupling 10. Coupling 10 will then empty at least partially. Shaft 22 perforce will slow down until the reverse sequence of events takes place. The relationship of the governed speed to the input speed of shaft 20 may be any desired ratio, e. g., 85%, depending on the strength of spring 64 and the pressure characteristics of the gear pump.

Then again, the transmission of this invention may be used as a load limiter to cause declutching when the load exceeds a certain amount. For this application, shaft 22 will drive shaft 20 and spring 68 will be stronger than spring 64. So long as the load on shaft 20 is not enough to cause material slippage in coupling 10, e. g., less than 10%, spring 68 is strong enough to keep holes 60 open against the pressure exerted by the gear pump on ring 62. Any increase in load resulting in a material increase in slippage in coupling 10 and consequent decrease in speed of shaft 20 causes the pump to exert a pressure greater than the resistance limit of spring 68. Ring 62 will move to the left, blocking holes 60 to the flow of oil, causing coupling 10 to empty and thereby declutching shafts 20 and 22. The exact declutching point depends, of course, on the strength of spring 68 and the pressure characteristics of the pump.

This transmission, used as an overrunning fluid clutch, is illustrated in Figure 5 in connection with a turbo-supercharger of an internal combustion engine. Gear 84 is mounted on shaft 20 and gear 102 on shaft 22. Gear 84 is connected through gear 104 to crankshaft 106 of a two-cycle reciprocating gas engine. Part of the engine, a cylinder 110 and piston 108, is illustrated in relation to the turbo-supercharger. Shaft 22 with its gear 102 is connected through gear 112 to the common shaft 114 of turbine 116 and compressor 118.

In starting up the engine, power is applied from crankshaft 106 through gears 104 and 84 to shaft 20. The rotation of shaft 20 operates the gear pump of control mechanism 23 which forces ring 62 to the right (Figure 1). Holes 60 are thus open for oil flow to hydraulic coupling 10. A full hydraulic coupling 10 transmits torque from shaft 20 to shaft 22 causing the latter to rotate and, in turn, gears 102 and 112 and shaft 114. Compressor 118 mounted on shaft 114 draws air through inlet 120, compresses it and forces it through line 122 for combustion in power cylinder 110 of the engine. Hot combustion gases issue from cylinder 110, flow through line 124, expand in turbine 116 and exit through outlet 126.

As the internal combustion engine load is increased and the exhaust temperature rises, the power available from turbine 116 will build up to the point where it will cause rotation of compressor 118 at a rate greater than is provided by gear 112. This means a complete reversal of torque on the entire supercharger drive mechanism and, due to the slip of the hydraulic coupling 10, reverses the relative rotation of shafts 20 and 22. This reversal, as explained hereinbefore, causes the gear pump to move ring 62 to the left (Figure 2), thereby stopping the oil supply to hydraulic coupling 10. Coupling 10 empties, allowing shaft 22 to free-wheel to the speed dictated by turbine 116.

In a specific installation in which a normally constant speed internal combustion engine is involved, shaft 20 drives shafts 22 and 114 until the turbine-compressor shaft 114 achieves about 6700 revolutions per minute. When the brake mean effective pressure of the engine reaches approximately 60 pounds per square inch, the usable heat energy in the exhaust gases expanding in turbine 116 is sufficient to reverse the torque. Thereupon the supply of oil to coupling 10 is stopped and shaft 22 free-wheels. In this installation, control mechanism 23 is actuated by Tuthill pump CSA-1 which is of the internal gear type.

During operation at low engine loads, e. g., idling, when the exhaust gases are relatively deficient in usable heat energy, the torque provided by turbine 116 to shaft 114 declines to the point where the clutch again engages and crankshaft 106 provides needed power to compressor 118.

In view of the various modifications of the invention which will occur to those skilled in the art upon consideration of the foregoing disclosure without departing from the spirit or scope thereof, only such limitations should be imposed as are indicated by the appended claims.

What is claimed is:

1. An overrunning fluid drive comprising a driving shaft, a driven shaft, a hydraulic coupling positioned to provide a driving connection between the two said shafts, said hydraulic coupling having invariable means for draining liquid therefrom at a lower rate than the maximum rate at which liquid can flow to said hydraulic coupling, a passageway in one of the two said shafts for the flow of liquid to said coupling, a pump housing connected to one of said shafts and rotatable therewith, a pump rotor disposed in said housing and connected to the other of said shafts for rotation therewith, and valve means associated with said passageway and actuated by the pumping pressure developed by the relative rotation of said housing and said rotor to open the flow of said liquid through said passageway when said driving shaft rotates faster than said driven shaft and to stop the flow of said liquid when said driven shaft rotates faster than said driving shaft.

2. An overrunning fluid drive comprising a driving shaft, a driven shaft, a hydraulic coupling positioned to provide a driving connection between the two said shafts, said hydraulic coupling having invariable means for draining liquid therefrom at a lower rate than the maximum rate at which liquid can flow to said hydraulic coupling, a passageway in said driving shaft for supplying liquid to said coupling, a pump housing connected to said driving shaft and rotatable therewith, a pump rotor disposed in said housing and connected to said driven shaft for rotation therewith, and valve means in said passageway actuated by the pumping pressure developed by the relative rotation of said housing and said rotor to open the flow of said liquid through said passageway when said driving shaft rotates faster than said driven shaft and to stop the flow of said liquid when said driven shaft rotates faster than said driving shaft.

3. The overrunning fluid drive of claim 2 wherein the pump housing and rotor are of the internal gear type.

4. The overrunning fluid drive of claim 2 wherein the valve means comprises a ring member disposed in concentric and axially movable relation to said driving shaft.

5. An overrunning fluid drive comprising a hollow shaft and the casing of a hydraulic coupling attached to an end of said hollow shaft, said casing being perforated for the drainage of liquid therefrom at a lower rate than the maximum rate at which liquid can flow to said casing, a second shaft and the rotor of said hydraulic coupling attached to said second shaft, a gear pump having its casing mounted for rotation with said hollow shaft and its rotor shaft connected by a flexible coupling with said second shaft, said flexible coupling being positioned concentrically in said hollow shaft, means for introducing liquid into said hollow shaft, and an annular valve mechanism disposed in said hollow shaft to control the introduction of liquid into said hollow shaft and actuated by the pumping pressure developed with said pump by the relative rotation of said hollow shaft and said second shaft.

6. A variable transmission between first and second shafts comprising the casing of hydraulic coupling attached to one of said shafts, said casing being perforated for the drainage of liquid therefrom at a lower rate than the maximum rate at which liquid can flow to said casing, the rotor of said hydraulic coupling attached to the other of said shafts, a passageway through one of said shafts for supplying liquid to said hydraulic coupling, valve means to control the flow of liquid in said passageway, and a pump, the housing of which rotates with one of said shafts and the rotor of which rotates with the other of said shafts, to exert pumping pressure on said valve means to actuate the same in response to the relative rotation of said shafts.

7. The variable transmission of claim 6 wherein the pump is of the internal gear type.

References Cited in the file of this patent

UNITED STATES PATENTS

| Number | Name | Date |
|---|---|---|
| 2,018,616 | Martyrer | Oct. 22, 1935 |
| 2,379,174 | Miller | June 26, 1945 |
| 2,521,117 | DuBois et al. | Sept. 5, 1950 |